Figure 1:
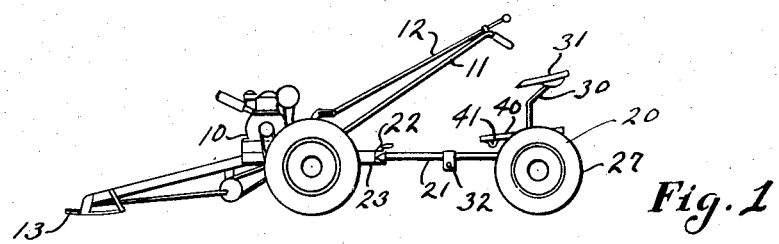
Figure 2:
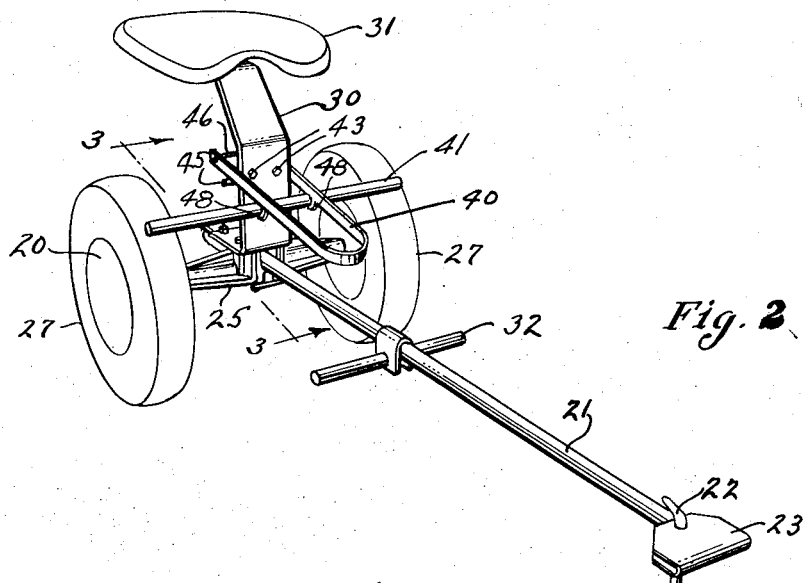

July 3, 1951   W. M. WOODARD ET AL   2,558,917
BRAKING DEVICE FOR AGRICULTURAL VEHICLES
Original Filed July 28, 1948

INVENTOR.
WALTER M. WOODARD &
ALBERT E. TAYLOR
BY Bates, Pearce & McBean
Attorneys Patented July 3, 1951

2,558,917

UNITED STATES PATENT OFFICE 2,558,917

BRAKING DEVICE FOR AGRICULTURAL VEHICLES

Walter M. Woodard, Willoughby, and Albert E. Taylor, Mentor, Ohio, assignors to Bready Tractor & Implement Company, Solon, Ohio, a corporation of Ohio Original application July 28, 1948, Serial No. 41,075. Divided and this application October 25, 1949, Serial No. 123,478

5 Claims. (Cl. 188—19)

This application is a division of our application Serial No. 41,075, filed July 28, 1948, for a Sulky.

This invention relates to a braking device for an agricultural vehicle of the type having an operator's seat supported by a standard rising from the frame carrying the wheels. The object of the invention is to provide such braking device in a very simple form which may be readily applied to the vehicle in position for immediate operation by the user on the seat, whenever desired. Our braking device is well adapted for instance for mounting on a sulky adapted to be connected by a draw-bar to such a power tractor as ordinarily operated by one walking behind the vehicle. The invention is illustrated in the drawings hereof and is hereinafter more fully described and its essential novel characteristics are set out in the claims.

In Fig. 1, we have shown a two-wheeled tractor indicated in general at 10, as having handles 11 which extend upwardly and rearwardly from the frame, and as having a control member 12 adjacent the upper end of the handles. This view shows an implement 13, such as a reciprocating cutter, mounted in front of the frame. Normally the operator walks behind the tractor and steers it by manipulating the handles as desired.

The present embodiment of our invention comprises a two-wheeled sulky 20 which is adapted to be removably connected to the tractor frame by a draw-bar 21. The rear end of this draw-bar is connected to the sulky frame, while the forward end is adapted to be attached to the tractor frame by a pivot pin 22. This pin is shown in Fig. 1 as connecting the draw-bar to a member 23 attached to the tractor frame.

The sulky frame, as shown, comprises a cross member 25 carrying the axle 26 on which the wheels 27 are mounted. Secured to the frame 25, and rising from an intermediate portion thereof, is the standard 30 carrying the seat 31. This standard, as shown, is in the usual form of a flat bar having some resilience. The draw-bar is preferably provided with a short cross bar 32 at a proper distance in front of the seat to form a rest for the driver's feet.

In our invention we pivot to the standard 30 in a region between the axle frame and seat a lever 40 extending forwardly and carrying in front of the standard a cross bar 41 which overhangs the two wheels. A spring maintains the cross bar normally out of engagement with the wheels, but whenever desired the operator on the seat may with his foot press the forward end of the lever downwardly to bring the cross bar into engagement with the periphery of the wheels with the desired pressure to retard them.

Preferably we make the lever 40 in the form of a U-shaped yoke which extends onto opposite sides of the standard and has its free arms projecting at the rear thereof. We bolt a bracket 42 to the rear face of the standard, as by bolts passed through the standard, as shown at 43. The yoke arms are pivoted to the bracket at 44. The bracket carries a laterally projecting bar 45 extending beneath the rear arms of the yoke and forming a stop limiting the downward movement of such rear arms. The rear ends of the yoke are connected by a cross pin 46. A tension spring 47 is anchored at its upper end to this cross pin and at its lower end to the axial frame. This normally maintains the yoke with the forward portion at its uppermost position and the rear portion engaging the stop bar.

Figure 3:
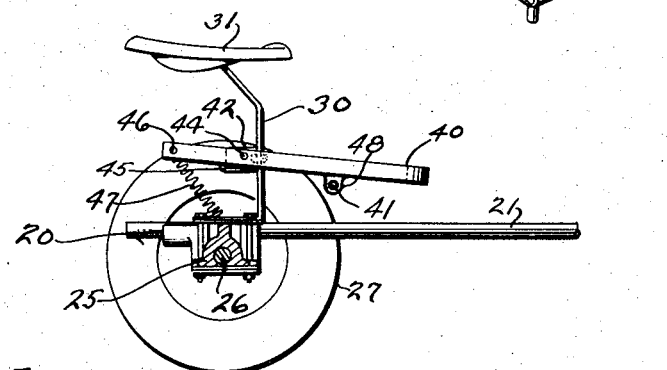

The cross bar 41 is preferably mounted in a pair of ears 48 formed on the underside of the two yoke arms in front of the standard. The position of this cross bar is such that its end portions stand a short distance above the periphery of the wheels but normally clear them, as shown in Figs. 1 and 3. When the operator wishes to apply the brake he merely places his foot on the U-bend of the yoke and presses downwardly thereon, thus bringing the cross bar into engagement with the wheels. Such engagement of the cross bar with the wheels takes place on a slight downward movement of the yoke while its U-bend is well above the draw bar.

In the embodiment shown, the operator seated on the seat and with his feet normally on the foot rest 32 may, whenever desired, readily raise one foot and place it on the loop of the yoke to apply the brake. The brake lever and cross bar 41 are in such position that they do not interfere in any manner with the driver on the seat and with his feet on the foot rest.

It will be seen that our braking device is extremely simple in construction and may be readily attached to a vehicle having a standard carrying a seat; also it may be made of comparatively light material, adding only slightly to the weight of the vehicle.

We claim:

1. The combination of an axle frame, a pair of wheels respectively at opposite ends thereof, a standard secured to the axle frame and rising centrally therefrom, a seat on the upper end of the standard, a lever in the form of a U-shaped yoke with its arms extending about opposite edges of the standard, means for pivoting said arms to the standard, a cross bar secured to the yoke in front of the standard behind the U-bend thereof, said cross bar extending across the periphery of the wheels, and means normally maintaining the cross bar out of engagement with such periphery while allowing it to assume such engagement on downward pressure on the loop of the yoke.

2. The combination of an axle frame, a pair of wheels respectively at opposite ends thereof, a standard secured to the axle frame and rising therefrom, a bracket secured to the standard, said bracket carrying a stop, a lever pivoted to the bracket, a spring tending to force the lever against the stop, and a cross bar carried by the lever and normally maintained by the spring out of engagement with the periphery of the wheels but in position to contact such periphery upon movement of the lever.

3. The combination of an axle frame, a pair of wheels respectively at opposite ends thereof, a standard in the form of a flat bar secured to an intermediate region of the axle frame and rising therefrom, a lever in the form of a U-shaped yoke having its arms extending across opposite edges of the standard bar, a bracket secured to the rear face of the standard bar, means for pivoting the yoke of the bracket, and a cross bar mounted laterally in downwardly projecting ears on the arms of the yoke between its pivot and the U-bend of the yoke and projecting across the wheels in overhanging position to engage the same when the forward end of the yoke is depressed.

4. The combination of an axle frame, a draw-bar secured to the central region thereof, wheels respectively at opposite ends of the axle frame, a centrally located standard secured to the axle frame and rising therefrom, a seat on the upper end of the standard, a lever pivoted to the standard and extending forward thereof above the draw-bar and accessible to the foot of the user on the seat, a cross bar carried by the lever and adapted to extend across the periphery of the wheels, and means for maintaining the cross bar normally out of engagement with the wheels, the draw-bar, lever and cross bar being so correlated that the cross bar engages the wheels on downward movement of the lever while the lever is still out of engagement with the draw-bar.

5. A sulky comprising a draw-bar having detachable connecting means at the forward end, an axle frame extending transversely of the draw-bar and secured to the rearward end thereof, a wheel carried at each end of the axle frame, a standard extending upwardly from the axle frame and having a seat thereon, a movable member pivotally carried by and extending forwardly of the standard and having a bar carried thereby, said bar projecting laterally of the last-mentioned member and being adapted to overhang and engage the wheels upon downward movement thereof, and means for normally holding the bar out of contact with the wheels but allowing it to make such contact when the member is moved.

WALTER M. WOODARD.
ALBERT E. TAYLOR.

REFERENCES CITED

The following references are of record in the file of this patent:

UNITED STATES PATENTS

| Number | Name | Date |
|---|---|---|
| 321,709 | Garmon | July 7, 1885 |
| 343,484 | McKean | June 8, 1886 |
| 898,904 | Londress | Sept. 15, 1908 |

FOREIGN PATENTS

| Number | Country | Date |
|---|---|---|
| 17,584 | Great Britain | Oct. 3, 1892 |